US006697417B2

United States Patent
Fernandez-Corbaton et al.

(10) Patent No.: US 6,697,417 B2
(45) Date of Patent: Feb. 24, 2004

(54) SYSTEM AND METHOD OF ESTIMATING EARLIEST ARRIVAL OF CDMA FORWARD AND REVERSE LINK SIGNALS

(75) Inventors: Ivan Fernandez-Corbaton, San Diego, CA (US); Nadav Levanon, Ramat-Gan (IL)

(73) Assignee: Qualcomm, Inc, San Diego, CA (US)

( * ) Notice: Subject to any disclaimer, the term of this patent is extended or adjusted under 35 U.S.C. 154(b) by 29 days.

(21) Appl. No.: 09/919,626

(22) Filed: Jul. 27, 2001

(65) Prior Publication Data

US 2003/0022627 A1 Jan. 30, 2003

(51) Int. Cl.[7] .............................................. H04B 1/707
(52) U.S. Cl. ........................ 375/147; 375/150; 375/354
(58) Field of Search ................................ 375/130, 140, 375/141, 142, 147, 150, 316, 340, 354, 365, 367, 347, 349, 267; 370/320, 335, 342; 701/213, 214; 455/456, 67.1, 67.4; 342/450

(56) References Cited

U.S. PATENT DOCUMENTS

| | | | |
|---|---|---|---|
| 6,275,483 B1 * | 8/2001 | Papasakellariou et al. | 370/335 |
| 6,320,849 B1 * | 11/2001 | Hughes et al. | 370/310 |
| 6,327,471 B1 * | 12/2001 | Song | 455/440 |
| 6,421,369 B1 * | 7/2002 | Iwaskai et al. | 375/130 |
| 6,445,728 B1 * | 9/2002 | Byun | 375/142 |
| 6,493,539 B1 * | 12/2002 | Falco et al. | 455/67.1 |
| 6,549,545 B1 * | 4/2003 | Yamamoto et al. | 370/508 |

FOREIGN PATENT DOCUMENTS

| | | | |
|---|---|---|---|
| EP | 0984563 | 3/2000 | H04B/1/707 |
| WO | 9810307 | 3/1998 | G01S/3/02 |

* cited by examiner

*Primary Examiner*—Chieh M. Fan
(74) *Attorney, Agent, or Firm*—Philip Wadsworth; Charles Brown; Donald Kordich

(57) ABSTRACT

A method for estimating the earliest signal arrival in a wireless communication system is presented. The system includes a base station that transmits a plurality of pilot signals and a mobile station configured to receive a plurality of signals corresponding to the pilot signals. The mobile station includes a receiver containing a searcher correlation mechanism and at least one finger correlation mechanism. The mobile station receiver detects the arrival times and energy levels of the received signals and constructs a searcher histogram and a finger histogram associated with each pilot signal. Each of the searcher and finger histograms represents an arrival time distribution of samples corresponding to the received signals. The mobile station receiver processes samples contained within each of the searcher histograms and the finger histograms to generate a plurality of estimated early signal arrivals. The earliest signal arrival is determined from the plurality of estimated early signal arrivals.

30 Claims, 4 Drawing Sheets

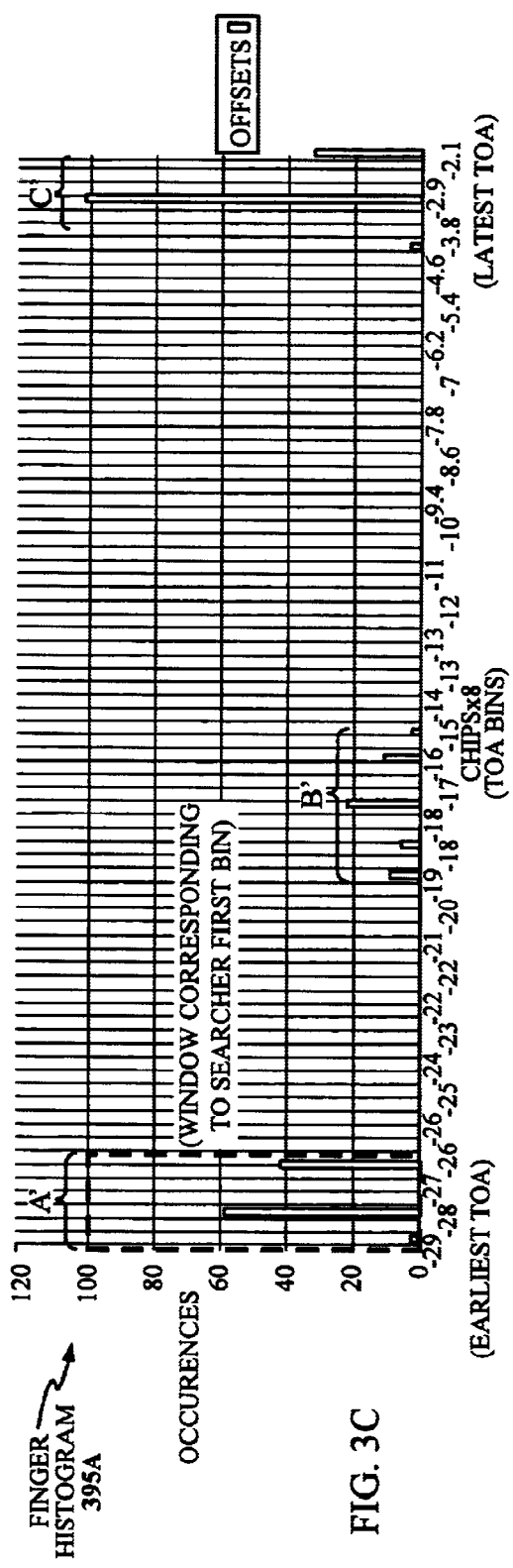
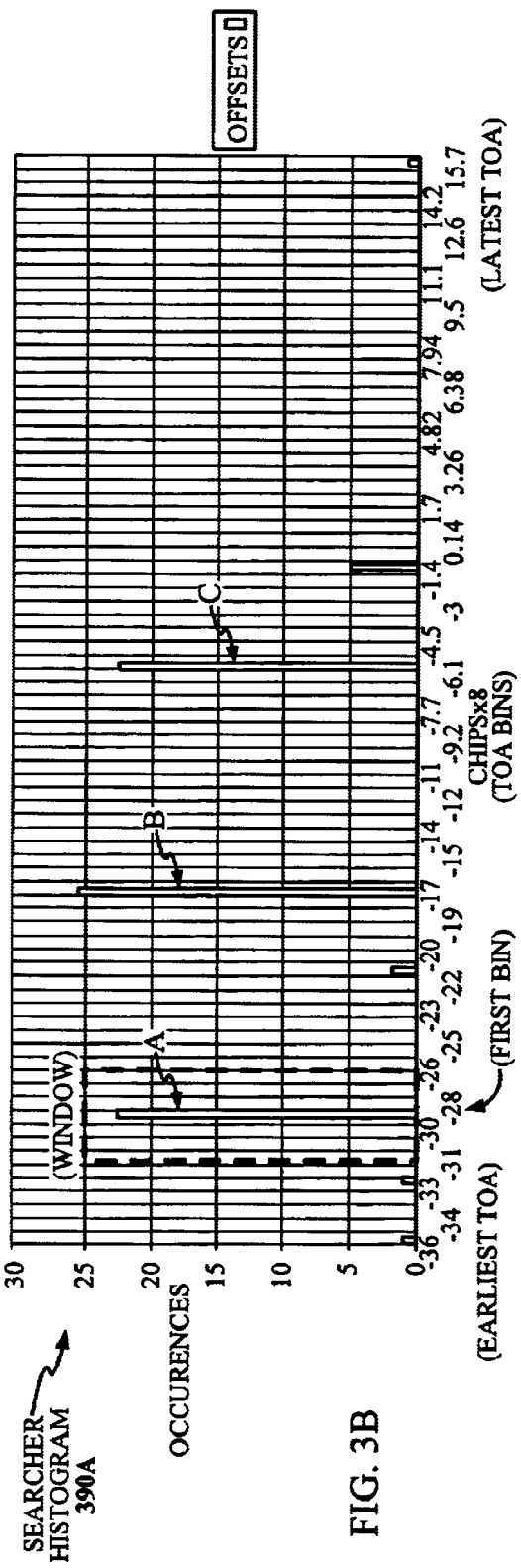
FIG. 3C
FIG. 3B

SYSTEM AND METHOD OF ESTIMATING EARLIEST ARRIVAL OF CDMA FORWARD AND REVERSE LINK SIGNALS

BACKGROUND OF THE INVENTION

1. Field of the Invention

The present invention relates in general to wireless communications systems and, in particular, to system and method for accurately estimating the earliest arrival of CDMA radio signals, either in the forward or reverse links.

2. Description of Related Art and General Background

Efforts are underway to augment wireless communications systems by adding the capability to locate the position of a particular mobile station (MS). The Federal Communications Commission (FCC) has promulgated a regulation directed to this capability (Docket No. 94-102, third report and order adopted Sep. 15, 1999, released Oct. 6, 1999). This regulation requires wireless carriers adopting hand-held position location solutions to locate the position of a mobile station making an emergency 911 call to within 50 meters for 67% of calls (and to within 150 meters for 95% of calls) by October 2001.

In satisfying this requirement, one approach to determining the position of a MS may be to use the available information at the base stations (BSs) and MSs of a wireless communication system, operating under Code Division Multiple Access (CDMA) schemes. CDMA is a digital radio-frequency (RF) channelization technique that is defined in the Telecommunications Industry Association/Electronics Industries Association Interim Standard-95 (TIA/EIA IS-95), entitled "MOBILE STATION-BASE STATION COMPATIBILITY STANDARD FOR DUAL-MODE WIDEBAND SPREAD SPECTRUM CELLULAR SYSTEM", published in July 1993 and herein incorporated by reference. Wireless communication systems employing this technology assign a unique code to each different communication signal and apply pseudonoise (PN) modulation to spread these communication signals across a common wideband spread spectrum bandwidth. As long as the receiving apparatus in a CDMA system has the correct code, it can successfully detect and select its signal of interest from the other signals concurrently transmitted over the same bandwidth.

FIG. 1 (Prior Art) illustrates a simplified block diagram of CDMA wireless communication system 100. System 100 allows MS 110, typically comprising mobile terminal equipment (TE2 device 102) and a wireless communication device (MT2 device 104) to communicate with an Interworking Function (IWF) 108. The IWF 108 serves as a gateway between the wireless network and other networks, such as the Public Switched Telephone Network (PSTN) and wireline packet data networks providing Internet- or Intranet-based access. MS 110 communicates with BS 106, which is associated with a geographic cell or sector, via the wireless interface $U_m$ on the reverse link transmission path. BS 106 is configured to process the communication signals from MS 110. BS 106 may also include, or be associated with, position processing capabilities (e.g., Position Determination Entity (PDE) server mechanisms).

On the forward link transmission path, BS 106 communicates with MS 110 via the wireless interface $U_m$. During forward link transmissions, each BS 106 is capable of transmitting information-bearing signals as well as control signals, such as pilot signals. Pilot signals have a plurality of uses, one of them is to identify the BS 106 best suited to accommodate reverse link transmissions. As such, pilot signals are instrumental in determining which BS 106 to "hand-off" the reverse link transmission to in order to seamlessly maintain communications as the MS 110 travels across different cells or sectors of cells. Pilot signals also provide a time and coherent phase reference to enable MS 110 to obtain initial system synchronization and facilitate coherent demodulation on the forward link. All pilot signals are subjected to the same PN spreading code but with a different code phase offsets to enable MS 110 to distinguish between different pilot signals coming from different sectors or base stations. Each BS 106 may transmit up to 6 different pilot signals with 6 different PN offsets. Use of the same pilot signal code allows MS 110 to find system timing synchronization by conducting a search through all pilot signal code phases of the same code.

As is well known, signal transmissions traveling across air interface $U_m$ may be subject to multipath propagation. As such, MS 110 may first receive a direct (i.e., line-of-sight (LOS)) signal corresponding to the forward link signal transmitted by BS 106, followed by time-delayed and attenuated versions of the same signal due to multipath. There may be situations where the first LOS signal is not received and only the multipath components are present. MS 110 may determine the time of arrival (TOA) and energy of all received pilot signals to identify the earliest useable received pilot signal.

To determine the TOA of the received pilot signals, MS 110 may count and store the number of chips (or fractions thereof) of PN code sequences (i.e., PN chips) that lapse from a reference while the signals were received. MS 110 may then identify the earliest received pilot signal by detecting which pilot signal was received after the smallest number of lapsed PN chips. The reference (or zero arrival time) may in general be an arbitrary mark: because of this, isolated TOA measurements cannot be used directly in position determination algorithms. There is the need of at least two TOA measurements corresponding to pilots coming from different geographical points to overcome this arbitrary error. For instance, by subtracting said two measurements, we get a measurement proportional to the difference between the radial distances of the mobile to the two origins: the common error induced by the ambiguity in the zero timing falls out in the subtraction.

To compensate for the effects of multipath propagation, CDMA systems, such as system 100, employ rake receivers, which process and combine the direct and multipath versions of the forward link pilot signal to generate a better received signal. FIG. 2 (Prior Art) depicts a high-level functional block diagram of a MS 110 receiver 200, including a rake receiver demodulator 225 for coherently demodulating the forward link signals received by MS 110. As indicated in FIG. 2, the radio-frequency/digital converter modulo 205 downconverts and digitizes the received signal from the antenna/producing digital samples. The digital samples are supplied to a rake receiver demodulator 225, which includes a searcher 215.

Searcher 215 is configured to search for signals by sweeping across the samples that are likely to contain multipath signal peaks in steps of one or half-PN chip increments. Searcher 215 then assigns finger correlators 210A–C to the stronger multipath signals. Each finger correlator 210A–C locks onto their assigned multipath signal, coherently demodulates the signal, and continues to track the signal until the signal fades away or the finger correlator 210A–C is reassigned by searcher 215. The demodulated outputs of finger correlators 210A–C are then combined by combiner 220 to form a stronger received signal.

Given the ability to detect the TOA of forward link signals, CDMA systems may, at least in theory, exploit these capabilities to extract MS 110 location information. As noted above, MS 110 is capable of determining the TOA of the received multipath components.

As noted above, the promulgated FCC regulation requires the location of a MS to within 50 meters for 67% of calls. A limitation of current CDMA systems is their inability to estimate TOAs with the necessary resolution to comply with the location requirements. For example, counting lapsed PN sequences to within a tolerance of a PN chip to determine the earliest received pilot signal, is of no consequence in establishing a communications link with the closest BS. However, given the fact that a PN chip corresponds to approximately 800 ns., which translates into a radial distance of 240 meters, such a tolerance clearly fails to comply with the location requirements.

Furthermore, since the LOS signal may not be the strongest signal arriving at the receiver, isolating that first arriving signal will not be a trivial task. Note that using a multipath delayed signal for ranging information will have an inherent error due to the extra delay.

Another limitation of current CDMA systems is the effect of time offset jittering on finger correlators of rake receivers. As noted above, the searcher in a MS rake receiver detects the strongest forward link receive signals and assigns a finger correlator to track and coherently demodulate one of the detected signals. However, due to the resolution on the hardware, finger correlators may experience jitter as they attempt to track their assigned signal. The resolution of finger correlators are typically ⅛ of a PN chip, which translates to jittering jumps of approximately 24 meters. Cumulatively, such effects may compromise the accuracy of the ranging information.

Accordingly, what is needed is a system and method capable of accurately estimating the earliest arrival of CDMA forward and reverse link signals.

SUMMARY OF THE INVENTION

The present invention addresses the need identified above by providing a novel system and method capable of accurately estimating the earliest arrival of forward and reverse link CDMA signals.

Although the description will be done for the forward link case where the receiver is the mobile station and the transmitters are the base stations, the method and apparatus of the present invention apply the same in the reverse link case where the base station acts as receiver and the mobile station is the transmitter.

System and methods consistent with the principles of the present invention as embodied and broadly described herein include a base station, or group of base stations, that transmit a plurality of pilot signals and a mobile station configured to receive a plurality of signals corresponding to one of the transmitted pilot signals. The mobile station includes a receiver containing a searcher correlating mechanism and at least one finger correlating mechanism. For each different pilot signal, the mobile station receiver detects the arrival times and energy levels of the multipath signals corresponding to said pilot and constructs a searcher histogram and a finger histogram representing an arrival time distribution of samples. The mobile station receiver processes the samples contained within searcher histogram and finger histogram to generate an estimate of the TOA for the first received multipath component of each pilot. At that point, the mobile station can choose to report all the results (one per pilot) to another entity (base station, PDE, ...), or if it has the knowledge of which PN pilot sequences are transmitted from which base stations, further process the measurements, reporting only one measurement per base station, corresponding to the smallest TOA of the pilots belonging to that base station.

BRIEF DESCRIPTION OF THE DRAWINGS

FIGS. 3B, 3C depict histograms generated by an embodiment of the present invention.

DETAILED DESCRIPTION OF THE INVENTION

The following detailed description refers to the accompanying drawings that illustrate embodiments of the present invention. Other embodiments are possible and modifications may be made to the embodiments without departing from the spirit and scope of the invention. Therefore, the following detailed description is not meant to limit the invention. Rather the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein.

Moreover, the processes associated with the presented embodiments may be stored in any storage device, such as, for example, non-volatile memory, an optical disk, magnetic tape, or magnetic disk. Furthermore, the processes may be programmed when the system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

Figure 1:
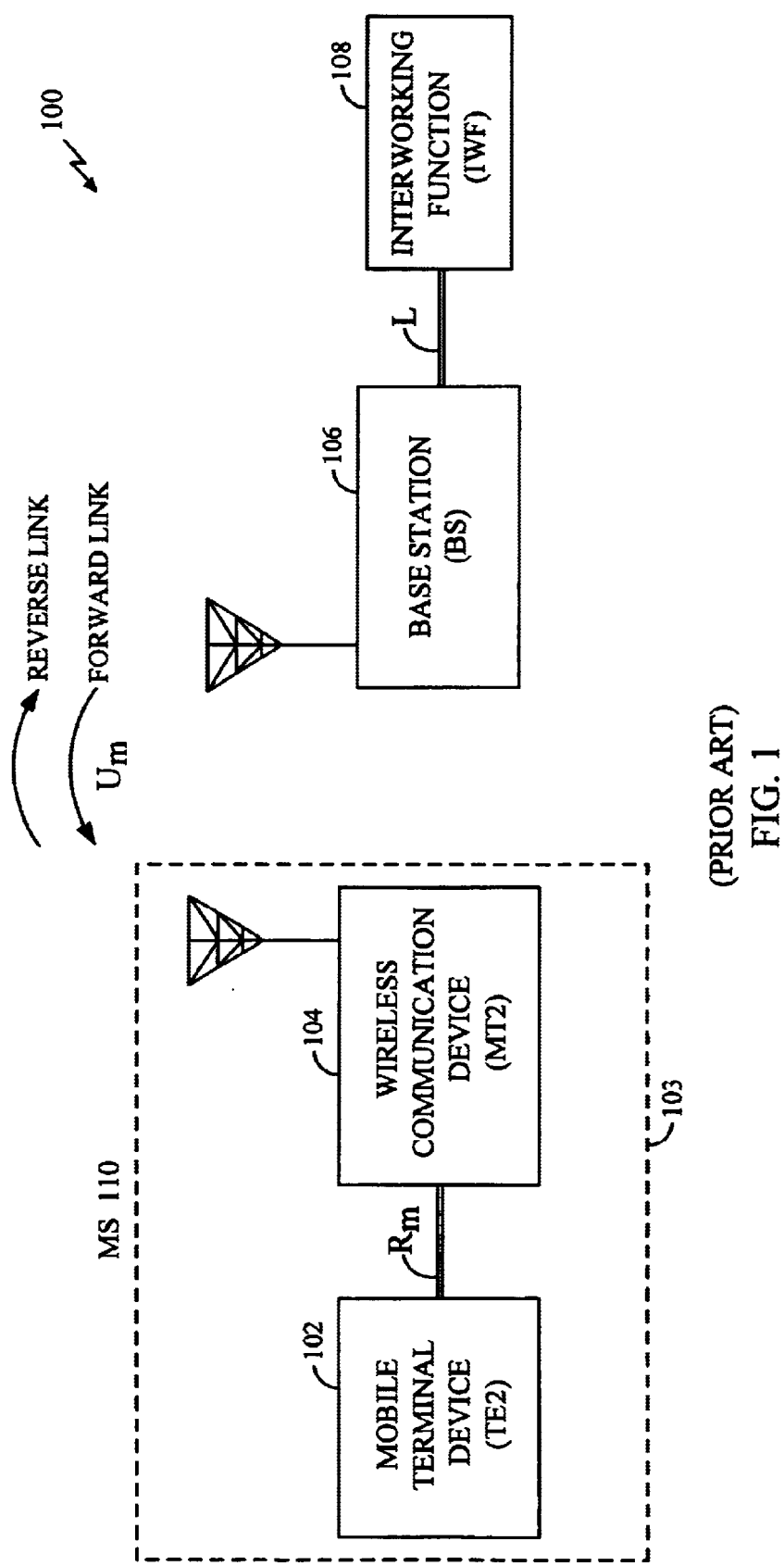
FIG. 1 (Prior Art) is a block diagram illustrating a conventional CDMA wireless communication system.
Figure 2:
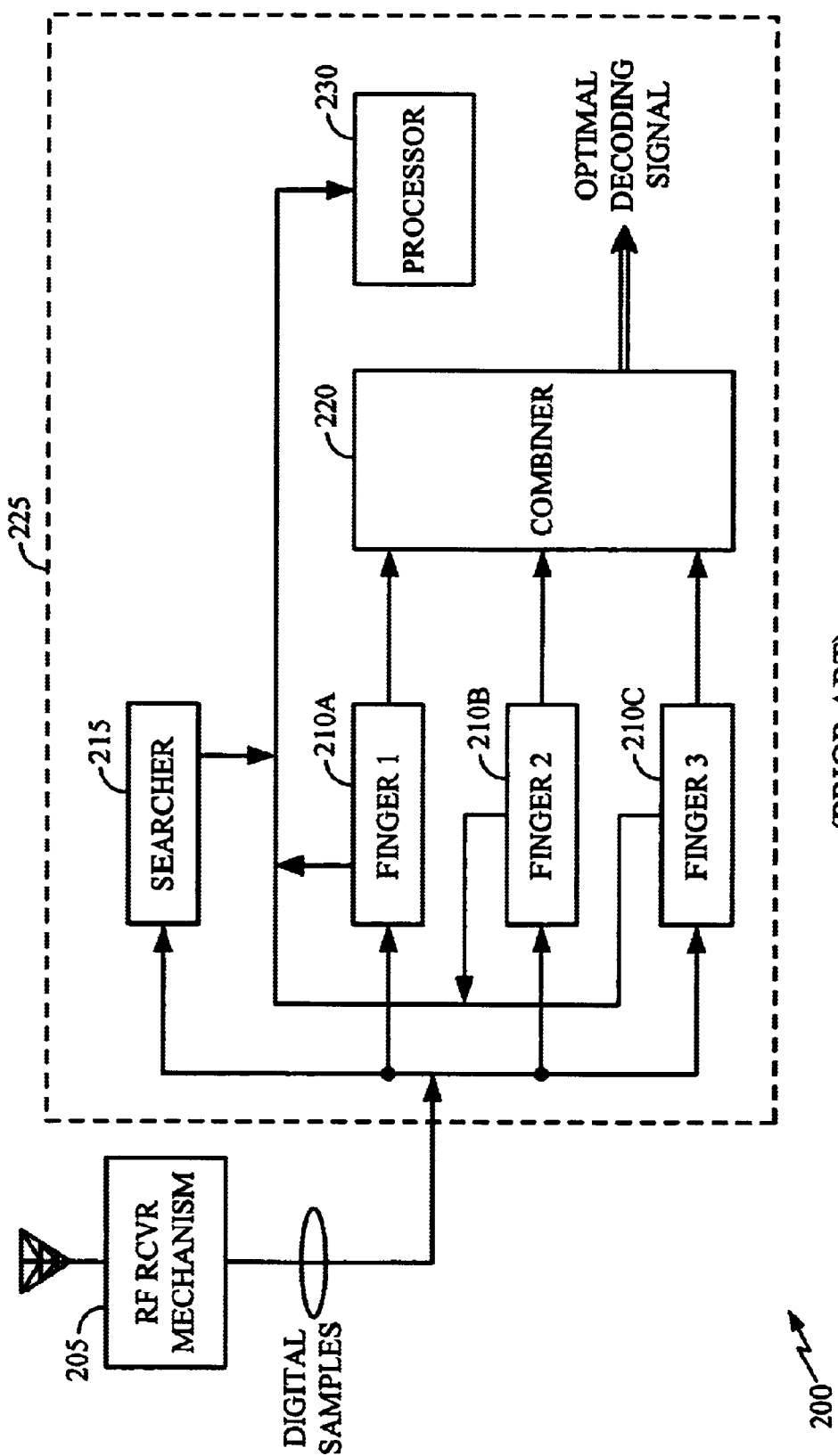
FIG. 2 (Prior Art) is a block diagram depicting a conventional CDMA rake receiver demodulator.
Figure 3A:
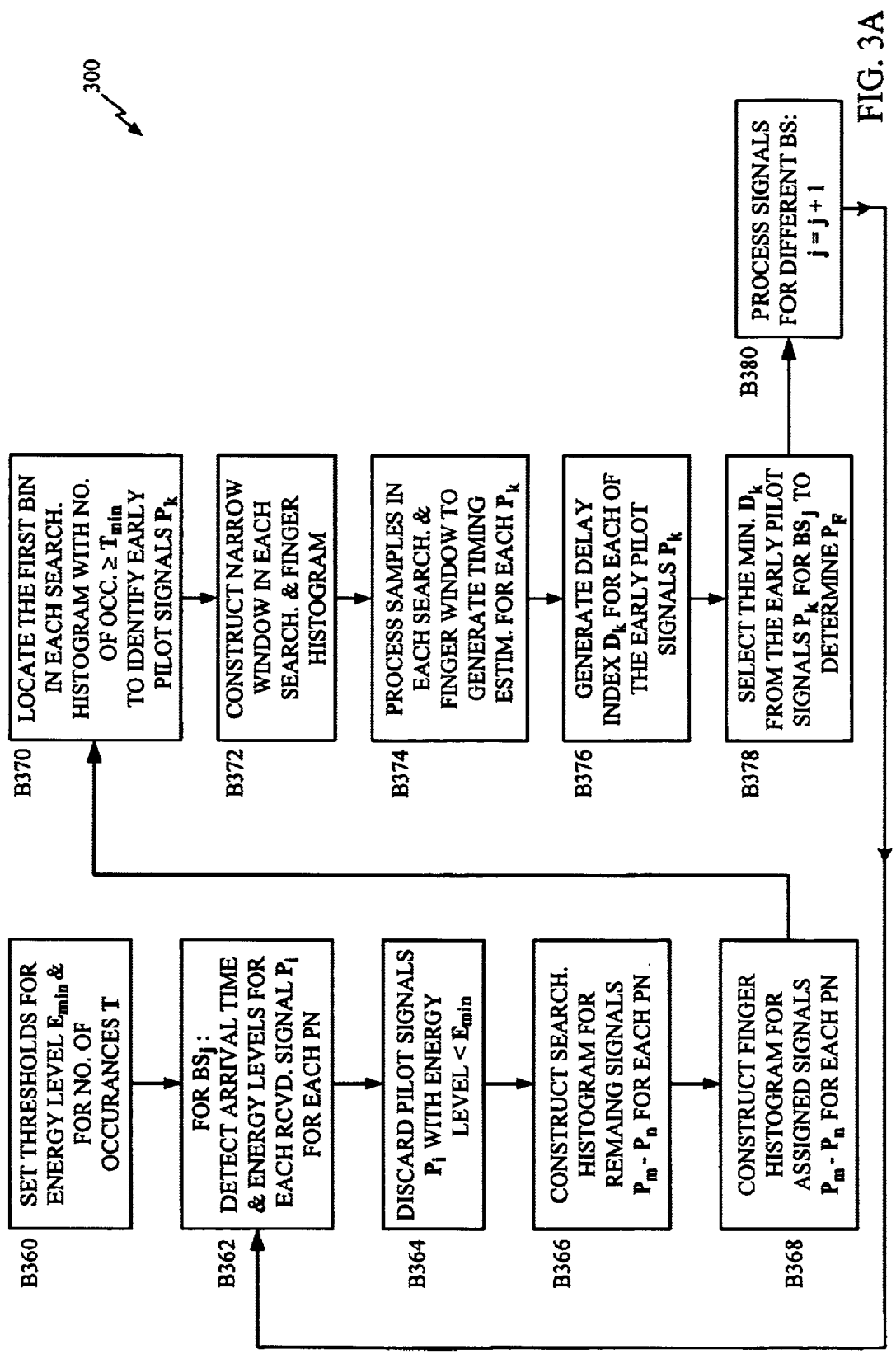
FIG. 3A is a flow-chart illustrating a process for estimating the earliest arrivals of CDMA signals, constructed and operative in accordance with an embodiment of the present invention.

FIG. 3A is a high-level flow diagram illustrating process 300, constructed and operative in accordance with an embodiment of the present invention. As indicated in block B360, process 300 first establishes, at searcher 215 of MS rake receiver 200, threshold levels for the minimum energy of pilot signals ($E_{min}$) to be processed, the minimum number of samples occurring for any bin ($T_{min}$) of a searcher histogram (to be described below). Threshold levels $E_{min}$, and $T_{min}$ will be used to discriminate between pilot signals, reflected multipath signals, noise, etc. and are, therefore, selected in a manner that ensures the processing of valid pilot signals.

In block B362, MS receiver 200 detects, for a particular BS (denoted $BS_j$), the relative $TOA_i$ and energy level $E_i$ for each signal $P_i$ received by searcher 215 of MS rake receiver 200. As noted above, each $BS_j$ may transmit up to 6 different pilot signals and for a given PN offset corresponding to a particular pilot signal, searcher 215 sweeps across samples corresponding to received signals in order to detect signal peaks. For a given PN offset, searcher 215 may detect signal peaks that comprise a corresponding LOS pilot signal, reflected versions of the pilot signal, and noise. Upon detecting signal peaks, searcher 215 measures the peaks and produces two values, one indicating when the signal arrives (TOA), and one indicating the energy of that signal (E). As noted above, the calculation of TOA may be achieved by counting and storing the number of PN chips that lapse while each signal was received.

In block B364, MS receiver 200 discards from further processing, any signal containing an energy level E that is less than threshold level $E_{min}$. By discarding signals with energy levels E less than $E_{min}$, process 300 ensures that the TOA estimation is from a valid pilot signal.

For each PN offset, MS receiver 200, in block B366, constructs a searcher histogram 390A for the undiscarded signals $P_m$–$P_n$ based on their corresponding $TOA_m$–$TOA_n$. As is well known, a histogram depicts the distribution of a collection of values over a predefined interval. In this case, searcher histogram 390A is constructed by collecting samples of signals having signal strengths above threshold level $E_{min}$ over a search period corresponding to a particular PN offset. For a $BS_j$ that transmits 3 pilot signals, MS receiver 200 may construct 3 separate searcher histograms 390A–390C.

An exemplary searcher histogram 390A for a particular PN offset is illustrated in FIG. 3B. The horizontal axis represents relative $TOA_m$ of an undiscarded signal $P_m$, measured in bins (from earliest –36 to latest 15.7), and the vertical axis represents the number of samples occurring at the relative $TOA_m$. Generally, the stronger the signals, the higher the number of occurrences within the bins: weak signals will be discarded more often by the $E_{min}$ threshold. Each bin is configured to represent a fraction of a PN chip, which depends on the resolution of the hardware. In an exemplary implementation, a bin is equivalent to 1/8 of a PN chip. As indicated in FIG. 3B, searcher histogram 390A contains three signal peaks A, B, C, as evidenced by three bins having the highest number of occurrences occurring at relative TOAs of –28, –16 and –4.

As noted above, for each PN offset, searcher 215 assigns a finger correlator 210A to a signal to track and process the corresponding samples in order to demodulate the signal. After finger correlators 210A–210C have been assigned to the strongest signal peaks (e.g., peaks A, B, C) by searcher 215, MS receiver 200, in block B368, constructs a finger histogram 395A for all the assigned signals $P_m$–$P_n$. Much like searcher histogram 390A, for a $BS_j$ transmitting three pilot signals, process 300 may construct three separate finger histograms 395A–395C.

An exemplary finger histogram 395A is shown in FIG. 3C. Although finger histogram 395A is similarly constructed to searcher histogram 390A, it is to be noted that finger histogram 395A depicts the distribution of the assigned signals $P_m$–$P_n$ with a higher resolution than searcher histogram 390A. As such, finger histogram 395A is more accurate than searcher histogram 390A and may indicate groups of signal peaks as the finger correlators 210A–210C track pilot signals $P_m$–$P_n$. These group signal peaks are symptomatic of the jittering effects noted above. As illustrated in FIG. 3C, finger histogram 395A contains a first significant group of peaks A', proximately disposed at relative TOA–28, a second significant group of peaks B', proximately disposed at relative TOA–17.5, and a third significant group of peaks C', proximately disposed at relative TOA–2.9.

In block B370, MS receiver 200 locates the first bin in each of the searcher histograms 390A–390C having the number of occurrences greater than or equal to $T_{min}$. By locating the first bin with a significant number of samples, process 300 maximizes the chances of identifying the earliest arriving pilot signals $P_k$ for each PN offset.

In block B372, MS receiver 200 constructs a narrow window around the first bin in each of the searcher histograms 390A–390C as well as constructs a narrow window around the samples in each of the finger histograms 395A–395C that correspond to the first bins of the searcher histograms 390A–390C. The searcher histogram 390A–390C and finger histogram 395A–395C windows compensate for the differences in the resolution between searcher 215 and finger correlators 210A–210C, which may result in the timing misalignment of the signal. Such misalignment is indicated in FIGS. 3B and 3C, where searcher histogram 390A demonstrates signal peaks A, B, C at respective TOAs of –28, –16 and –4 while finger histogram 395A demonstrates signal group peaks A', B', C' centered at respective TOAs of –28, –17.5, and –2.9.

FIGS. 3B and 3C also depict the constructed windows for a single searcher histogram 390A and finger histogram 395A set. The windows may be centered at a specific bin and have bin offsets equivalent to ± a fraction of a PN chip (e.g., ±½ PN chip). For example, if the bins of the searcher histograms 390A–390C and finger histograms 395A–395C represent 1/8 of a PN chip, the windows would span 4 bins on either side of the respective bins for a window resolution of ±½ PN chip.

In block B374, MS receiver 200 processes the sample information contained within each set of searcher histogram 390A–390C and finger histogram 395A–395C windows to provide a timing estimate for each of the earliest arriving pilot signals $P_k$. In particular, for each set of searcher histogram 390A–390C and finger histogram 395A–395C windows, process 300 combines and averages all the samples contained within the respective windows to obtain an average TOA value (TOA_$mean_k$) for each of the earliest pilot signals $P_k$. If finger histograms 395A–395C do not contain samples corresponding to the first bins of searcher histograms 390A–390C, MS receiver 200 simply combines and averages the samples contained within the searcher histograms 390A–390C window to produce TOA_$mean_k$.

In block B376, MS receiver 200 produces a delay index $D_k$ for each of the estimated earliest arriving pilot signals $P_k$ transmitted by $BS_j$. For each of the earliest arriving pilot signals $P_k$, delay index $D_k$ provides a metric that accurately quantifies the delay incurred by each signal. Delay index $D_k$ is produced by subtracting a corresponding proportionate standard deviation quantity from each of the TOA_$mean_k$ values calculated in block B374. As is well known, the standard deviation is a quantity that measures the distribution (i.e., spread) of a collection of samples. Subtracting the standard deviation from TOA_$mean_k$, minimizes the error arising from reflections, noise, or interference, thereby providing a more accurate estimation of the timing for each of the earliest arriving pilot signals $P_k$. MS receiver 200 may then forward the delay index $D_k$ information to $BS_j$ to determine the first pilot signal ($P_F$) from all the earliest arriving pilot signals $P_k$. Note that the preceding description assumes that the mobile stations knows which pilots come from which base stations: should the mobile station lack such knowledge, it would report all the $D_k$ values and leave further processing to another entity.

In block B378, process 300 determines $P_F$ by selecting the minimum of the forwarded delay indices $D_k(D_{k,min})$ produced for each of the earliest arriving pilot signals $P_k$. By definition, $D_{k,min}$ corresponds to the minimal delay incurred by any of the earliest arriving pilot signals $P_k$ corresponding a given base station $BS_j$. Therefore, by selecting $D_{k,min}$, process 300 identifies the first pilot signal $P_F$ from all the earliest arriving pilot signals $P_k$.

Because MS 110 may not possess a priori knowledge of which $BS_j$ is transmitting which PN offset, the selection of $D_{k,min}$ may be performed by $BS_j$, or an associated PDE server (noted above), which has that knowledge.

Finally, in block B380, process 300 increments a counter and returns to block B362 to point to a new $BS_{j+1}$ in order to determine the earliest arriving pilot signal originating therefrom. If the mobile does not have the knowledge of which pilot signals correspond to which base stations, the process starting at B362 would loop across all pilot signals (instead of across all base stations) and the final step B378 will need to be performed somewhere else.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed is:

1. A method for estimating an earliest signal arrival in a wireless communication system comprising a base station and a mobile station, said mobile station including a receiver containing a searcher correlating mechanism and at least one finger correlating mechanism, said method comprising:
   detecting, in said mobile station receiver, arrival times and energy levels of a plurality of signals received by said mobile station, said plurality of received signals corresponding to a plurality of pilot signals transmitted by said base station;
   constructing a searcher histogram and a finger histogram associated with each of said pilot signals based on samples corresponding to said received signals meeting a predetermined energy threshold level, each of said searcher histograms and finger histograms representing an arrival time distribution of said received signals;
   processing samples contained within each of said searcher histograms and said finger histograms to generate a plurality of estimated early signal arrivals, each of said estimated early signal arrivals corresponding to one of said pilot signals; and
   determining the earliest signal arrival per base station based on the earliest of said estimated early signal arrivals.

2. The method of claim 1, further including identifying a first bin in each of said searcher histograms containing a number of samples greater than a predetermined threshold.

3. The method of claim 2, further including,
   constructing searcher windows around said samples contained within each of said searcher histogram first bins, and
   constructing finger windows around samples of each of said finger histograms corresponding to said samples contained within each of said searcher histogram first bins.

4. The method of claim 3, wherein said searcher windows and said finger histogram windows are centered at a bin and have an offset of ±a fraction of a PN chip.

5. The method of claim 4, wherein said processing samples includes,
   combining samples contained within each of said searcher windows and said finger windows.

6. The method of claim 5, wherein said processing samples further includes,
   averaging said combined samples to generate said each of said estimated early signal arrivals corresponding to one of said plurality of pilot signals.

7. The method of claim 6, further including generating a delay index for each of said estimated early signal arrivals.

8. The method of claim 7, wherein each of said delay indexes is generated by subtracting a corresponding proportionate standard deviation quantity from each of said estimated early signal arrivals.

9. The method of claim 8, wherein said determining the earliest signal arrival per base station includes determining the minimum of said delay indexes which corresponds to the earliest signal arrival.

10. The method of claim 9, wherein said mobile station forwards said delay indexes to said base station or a position determination entity to select said minimum delay index corresponding to the earliest signal arrival.

11. A system for estimating an earliest signal arrival in a wireless communication system, comprising:
    a base station transmitting a plurality of pilot signals; and
    a mobile station configured to receive a plurality of signals corresponding to said pilot signals, said mobile station including a receiver containing a searcher correlating mechanism and at least one finger correlating mechanism,
    wherein said mobile station receiver detects arrival times and energy levels of said received signals, constructs a searcher histogram and a finger histogram associated with each of said pilot signals, each of said searcher histograms and said finger histograms representing an arrival time distribution of samples corresponding to said received signals meeting a predetermined energy threshold level, processes said samples contained within each of said searcher histograms and said finger histograms to generate a plurality of estimated early signal arrivals, and
    wherein the earliest signal arrival is determined based on the earliest of said estimated early signal arrivals.

12. The system of claim 11, wherein said mobile station receiver identifies a first bin in each of said searcher histograms containing a number of samples greater than a predetermined threshold.

13. The system of claim 12, wherein said mobile station receiver constructs searcher windows around said samples contained within each of said searcher histogram first bins and constructs finger windows around samples of each of said finger histograms corresponding to said samples contained within each of said searcher histogram first bins.

14. The system of claim 13, wherein said searcher windows and said finger histogram windows are centered at a bin and have an offset of ±a fraction of a PN chip.

15. The system of claim 14, wherein said mobile station receiver processes said samples contained within each of said searcher histograms and said finger histograms by combining samples contained within each of said searcher windows and said finger windows.

16. The system of claim 15, wherein said mobile station receiver further processes said samples contained within each of said searcher histograms and said finger histograms by averaging said combined samples to generate said each of said estimated early signals arrivals corresponding to one of said pilot signals.

17. The system of claim 16, wherein said mobile station receiver generates a delay index for each of said estimated early signal arrivals.

18. The system of claim 17, wherein each of said delay indexes is generated by subtracting a corresponding proportionate standard deviation quantity from each of said estimated early signal arrivals.

19. The system of claim 18, wherein said determining the earliest signal arrival includes determining the minimum of said delay indexes, which corresponds to the earliest signal arrival.

20. The system of claim 19, wherein said mobile station forwards said delay indexes to said base station or a position determination entity to select said minimum delay index corresponding to the earliest signal arrival.

21. A machine-readable medium encoded with a plurality of processor-executable instruction sequences for estimating an earliest signal arrival in a wireless communication system comprising a base station and a mobile station, said mobile station including a receiver containing a searcher correlating mechanism and at least one finger correlating mechanism, said instruction sequences comprising:

detecting arrival times and energy levels of a plurality of signals received by said mobile station, said plurality of received signals corresponding to a plurality of pilot signals transmitted by said base station;

constructing a searcher histogram and a finger histogram associated with each of said pilot signals based on samples corresponding to said received signals meeting a predetermined energy threshold level, each of said searcher histograms and finger histograms representing an arrival time distribution of said samples;

processing samples contained within each of said searcher histograms and said finger histograms to generate a plurality of estimated early signal arrivals, each of said estimated early signal arrivals corresponding to one of said pilot signals; and determining the earliest signal arrival based on the earliest of said estimated early signal arrivals.

22. The machine-readable medium of claim 21, further including identifying a first bin in each of said searcher histograms containing a number of samples greater than a predetermined threshold.

23. The machine-readable medium of claim 22, further including, constructing searcher windows around said samples contained within each of said searcher histogram first bins, and constructing finger windows around samples of each of said finger histograms corresponding to said samples contained within each of said searcher histogram first bins.

24. The machine-readable medium of claim 23, wherein said searcher windows and said finger windows are centered at a bin and have an offset of ± a fraction of a PN chip.

25. The machine-readable medium of claim 24, wherein said processing samples includes, combining samples contained within each of said searcher windows and said finger windows.

26. The machine-readable medium of claim 25, wherein said processing samples further includes, averaging said combined samples to generate said each of said estimated early signal arrivals corresponding to one of said pilot signals.

27. The machine-readable medium of claim 26, further including generating a delay index for each of said estimated early signal arrivals.

28. The machine-readable medium of claim 27, wherein each of said delay indexes is generated by subtracting a corresponding proportionate standard deviation quantity from each of said estimated early signal arrivals.

29. The machine-readable medium of claim 28, wherein said determining the earliest signal arrival includes determining the minimum of said delay indexes, which corresponds to the earliest signal arrival.

30. The machine-readable medium of claim 29, wherein said mobile station forwards said delay indexes to said base station or a position determination entity to select said minimum delay index corresponding to the earliest signal arrival.

* * * * *